Oct. 11, 1955
C. W. BRANDON
2,720,082
MULTIPLE UNIT BARGE HAVING AN EXPANSION CHAMBER
COMMUNICATING WITH PLURAL STORAGE TANKS
Filed Feb. 4, 1952
3 Sheets-Sheet 1
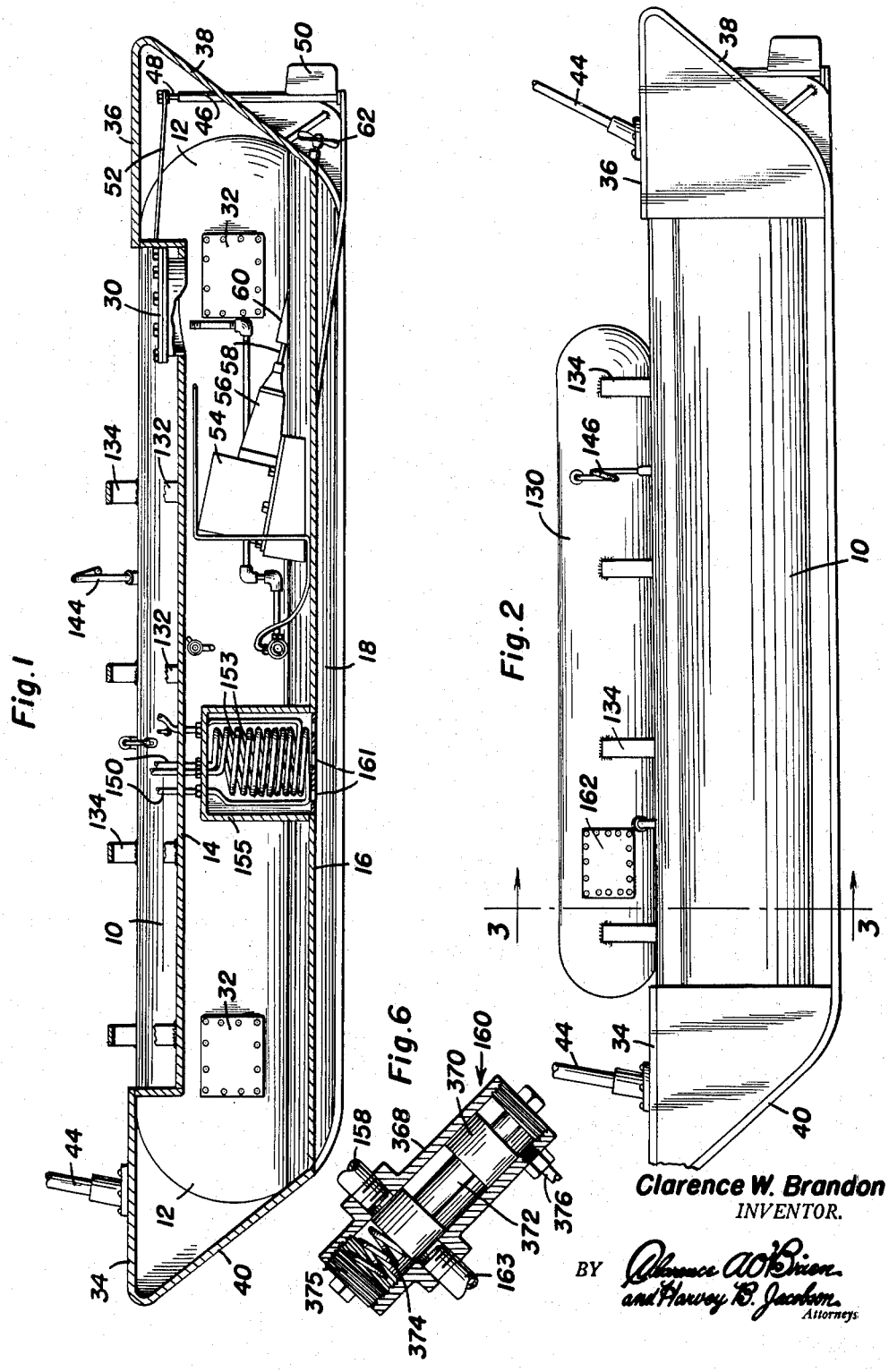
Clarence W. Brandon
INVENTOR.

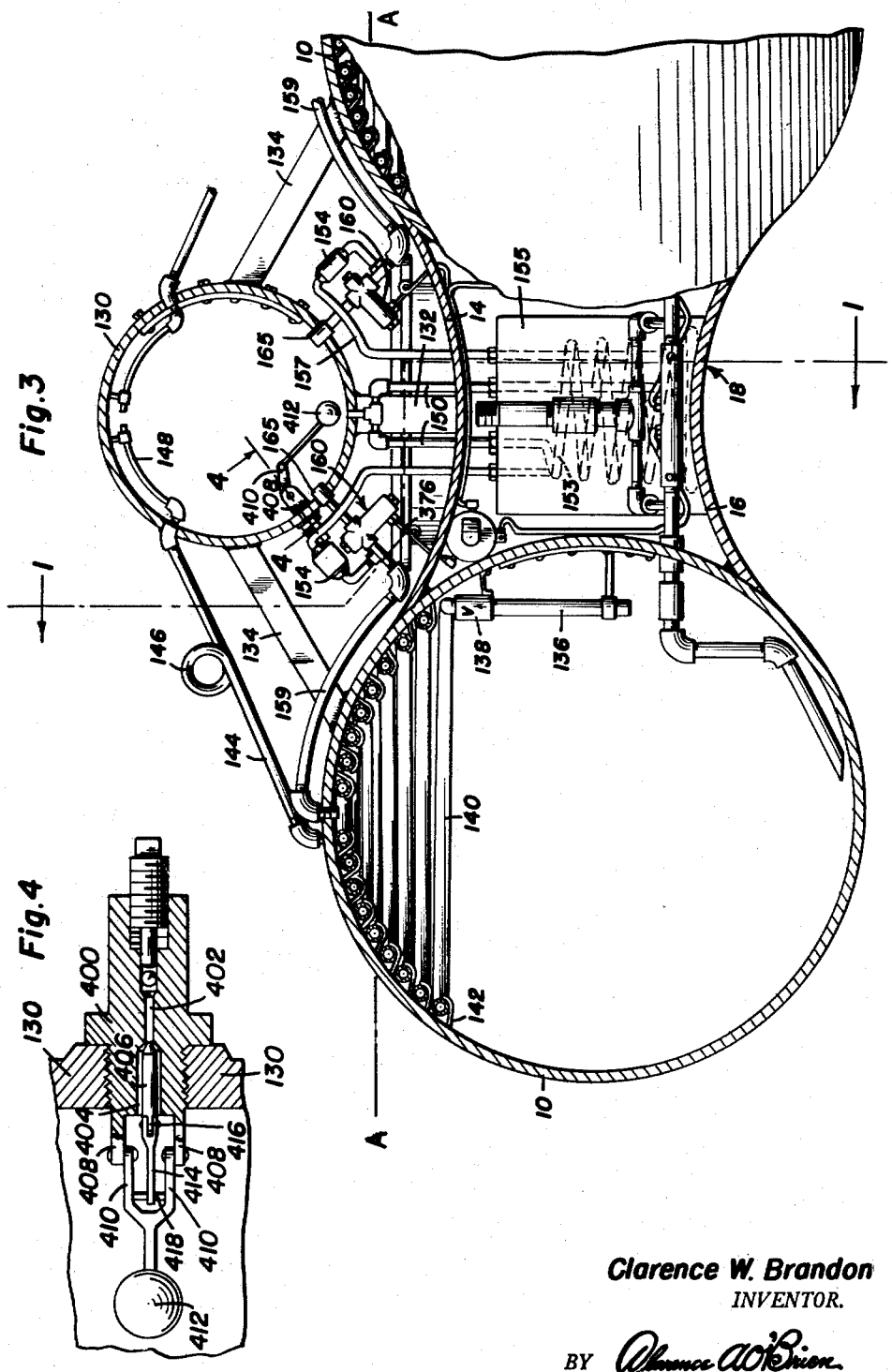

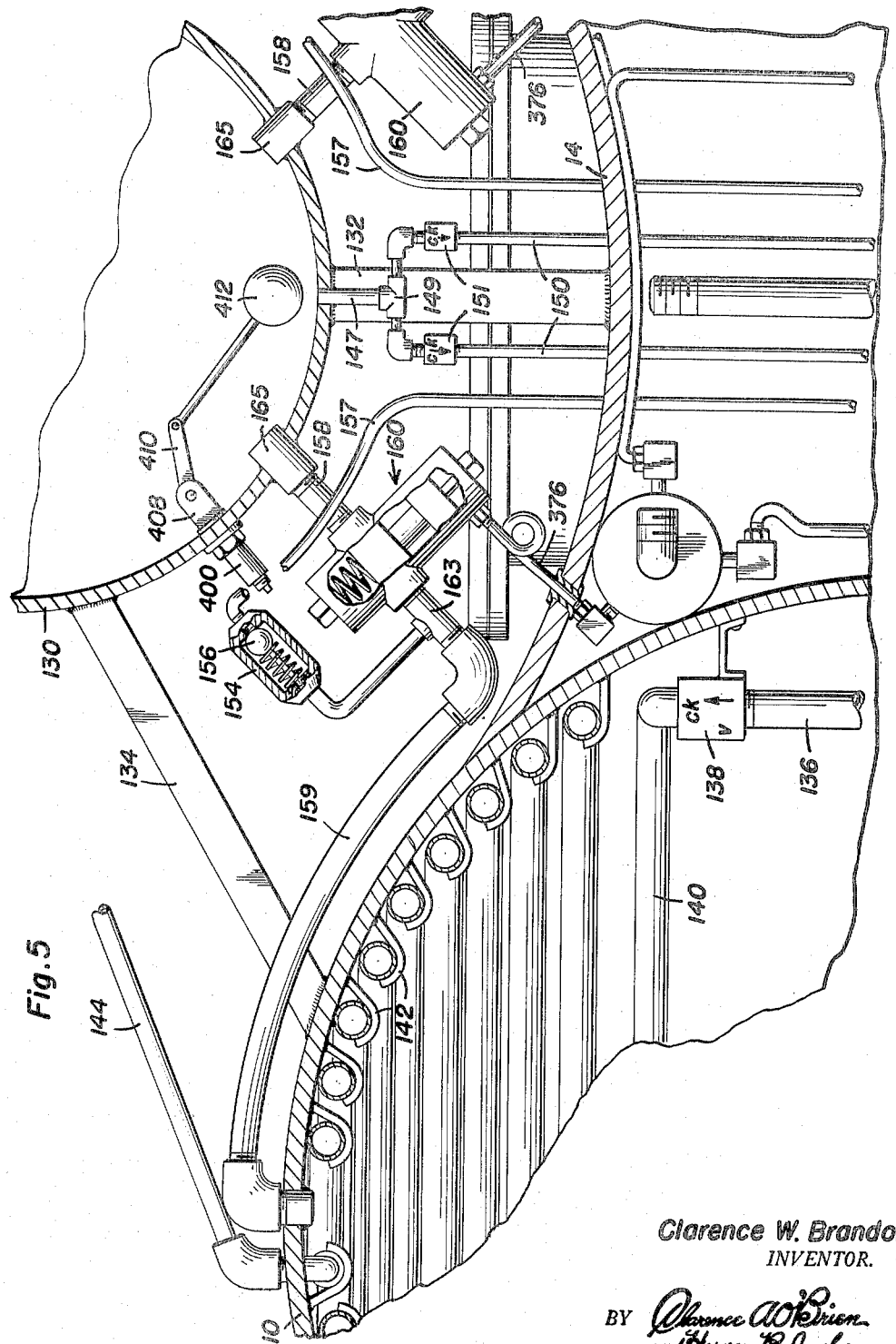

United States Patent Office 2,720,082
Patented Oct. 11, 1955

2,720,082

MULTIPLE UNIT BARGE HAVING AN EXPANSION CHAMBER COMMUNICATING WITH PLURAL STORAGE TANKS

Clarence W. Brandon, Tallahassee, Fla., assignor, by direct and mesne assignments, of forty-two and one-half per cent to N. A. Hardin, Hazel H. Wright, and Catherine H. Newton, all of Forsyth, Ga., and fifteen per cent to Harvey B. Jacobson, Washington, D. C.

Application February 4, 1952, Serial No. 269,791

10 Claims. (Cl. 62—1)

This invention comprises novel and useful improvement in a multiple unit barge, and in general comprehends apparatuses and methods for the storage, cooling and transportation of volatile liquids and other fluids. More specifically, it consists of a barge comprising a plurality of spaced, liquid containing tanks, which are rigidly attached together to form a seaworthy vessel.

The present application is a continuation-in-part of my prior application, Serial No. 74,546 filed February 4, 1949, for Multiple Unit Barge Having an Expansion Chamber Communicating With Plural Storage Tanks, which prior application contains subject matter which is similar to that set forth in the prior patent of Clarence W. Brandon and George M. Brandon, No. 2,408,505 and my copending application, Serial No. 39,154, filed July 16, 1948, for Method and Apparatus for the Storage, Refrigeration and Transportation of Volatile Liquids and Other Fluids, now patent 2,689,461 dated September 21, 1954; and my copending application Serial No. 228,654, filed May 28, 1951, for Multiple Unit Barge; and it further includes improvements over said prior patent and copending applications.

The industry of storing and transporting liquified volatile fluids has long recognized that the basic difficulties to be overcome arise from the necessity of maintaining the confined volatile fluids at a sufficiently low temperature despite their absorption of heat and to prevent their temperature and concomitant pressure rises, with the mechanical problems associated therewith.

It is, therefore, the primary object of this invention to provide an improved barge and an improved method for transporting, storing and/or refrigerating volatile liquids, such as propane, butane, ammonia, and the like.

A very important object of this invention is to effectively unite a plurality of separate fluid storage tanks in rigid, spaced assembly with respect to each other, to form in their entirety a durable and seaworthy barge.

A further object of the invention is to provide a barge wherein the necessary space between adjacent tank units may be employed to advantage for a variety of purposes such as the housing of controls and pipes, the mounting of machinery therein, the obtaining of access to the sides of the tanks, to provide additional buoyancy if desired, to admit water to all sides of the tanks for increased cooling of their contents, if desired, and to accommodate a strengthening and reinforcing structure for uniting the tank units.

And a final important object to be specifically enumerated herein is to provide a barge for transporting, storing and/or refrigerating volatile liquids and the like which shall have a maximum of structural strength and rigidity, a minimum of weight and be of a compact, simple and durable construction.

Another feature of the invention comprehends the provision of a periodic circulation of fluid from the storage chamber of a tank to a vapor chamber, and thence back to the storage chamber under the effect of thermodynamic action arising from the inflow of heat from the sun's rays or other sources into the contents of the tank, to effect a reduction in pressure and a refrigerating action upon the fluid stored within the tank.

These, together with various ancillary features and objects of the invention which will later become apparent as the following description proceeds, are attained in the manner and by the arrangements to be hereinafter described, and of which the accompanying drawings are to be regarded as illustrative of the principles of the invention only, and wherein:

Figure 1 is a vertical central longitudinal sectional view of a form of barge incorporating therein the principles of this invention, parts being broken away, and is taken upon the section line 1—1 of Figure 3;

Figure 2 is a side elevational view of the barge of Figure 1, parts being broken away;

Figure 3 is a fragmentary vertical transverse sectional view of the barge of Figures 1 and 2, parts being broken away and shown in section and parts in elevation, and is taken substantially upon the plane indicated by the section line 3—3 of Figure 2;

Figure 4 is a vertical sectional detail view upon an enlarged scale, taken substantially upon the plane indicated by the section line 4—4 of Figure 3 and showing the construction of a float operated control valve forming a part of the invention;

Figure 5 is an enlarged detail view of a portion of Figure 3; and

Figure 6 is a detail view showing in central section a control valve forming a part of the invention.

For an understanding of the principles of this invention, reference is made first to Figures 1–3 of the drawings, wherein it will be seen that the barge proper includes a pair of tanks indicated at 10, which may be of any desired material, shape and construction in accordance with the performance required for these tanks, and which may satisfactorily be of elongated cylindrical construction with rounded ends fore and aft as indicated in Figure 1 at 12. As will be clearly apparent from Figure 3, these tanks 10 are secured in parallel, spaced, side-by-side relation and are rigidly connected together as by upper and lower curved, or if desired, flat longitudinally extending partition members 14 and 16 which may be welded or otherwise rigidly attached to the tanks 10 at their bottom surfaces or between their sides at any suitable places, and which thus define an elongated chamber extending substantially the length of the tanks. In some instances, it may be deemed preferable to omit all or portions of these partition members to permit water to freely enter the spaces between the tanks, and in these instances the tanks will be rigidly united by any suitable truss or brace construction.

It should be noted that the lower connecting partition 16 may be curved upwardly from its merging with the lower portion of the circumference of the tanks, to define an elongated groove or channel extending medially of the barge and through the bow and stern and beneath the same, as for example, in the manner shown in Figure 1, this channel, indicated at 18, possessing several very important functions. The channel 18 permits the passage of water therethrough and therebeneath, thus reducing the frontal resistance to movement of the barge; serves to increase the surface contact of the barge with the water in which the device is immersed, thereby facilitating the cooling of the contents of the barge tanks by the direct transmission of heat therefrom into the surrounding subsurface layers of water which are generally at a substantially uniform temperature; serves much the same purpose as the keel of a vessel to facilitate stability and steering of the same; serves to provide an enclosed tunnel or chamber between the tanks of the barge for obtaining access to the same, for housing machinery and equipment therein, and enables the propeller to be positioned above the lower surface of the tank to prevent fouling of the propeller under water on obstructions such as shoals, sand bars, and the like.

At suitable locations along its length, the upper partion 14 is provided with manhole openings which are provided with removable closures 30, by means of which access may be obtained to the equipment and accessories of the barge housed within the central chamber or tunnel between the tanks.

As will be seen from Figure 1, the walls of the tanks 10 between the partitions 14 and 16 are provided with any suitable number of removable manhole covers 32 by means of which access may be obtained to the interior of the tanks 10 from the centrally disposed chamber for inspection or repair.

As shown best in Figures 1 and 2, the fore and aft portions of the barge are provided with hollow prow and stern assemblies, separately formed and directly attached to and carried by the tanks. The assemblies, which may be either permanently or detachably connected in any suitable manner to the tanks, include decks 34 and 36, respectively, which extend transversely of, overlie the front and rear ends of the tanks 10, and are rigidly attached thereto, serve the dual function of imparting rigidity to the structure as well as providing a deck space for the customary purposes. The rear deck 36 is provided with suitably contoured depending plates 38 which merge into the lower surface of the tanks 10 and are shaped to constitute a stern for the barge, while the front deck 34 is provided with similar plates 40 contoured to form a prow for the same. Thus, it will be seen that the plurality of tanks, two or more, are rigidly attached in side-by-side relation to form the hull of the barge, and are provided with a bow and stern assembly rigidly attached thereto and directly carried thereby to form the association of tanks into a seagoing vessel. As above mentioned, the channel 18 is preferably extended through these assemblies as shown in Figure 1.

Suitable masts or standards 44 may be mounted in any convenient manner upon the barge for carrying flags, signal lights, radio aerials, or the like.

The stern assembly of the barge is provided with a suitable rudder post housing 46, shown more clearly in Figure 1, having the rudder shaft 48 therein, the lower end of this shaft being provided with the usual rudder 50. The rudder may be controlled by a cable 52 or any other suitable means within the central tunnel or housing between the tanks, whereby the control means may be accessible for inspection or repair.

As above mentioned, the central tunnel or housing between the upper and lower partitions 14 and 16 may be employed to house the propulsion mechanism, and for this purpose there may be provided any suitable type of marine engine indicated by the numeral 54, and which, by means of a suitable transmission 56, operates a propeller shaft 58 extending through a suitable housing 60 which passes through the lower partition 16, and is provided at its lower and outer end with a propeller 62 of any conventional design, this propeller being received within or adjacent the end of the tunnel 18.

By this arrangement, it will be seen that the engine 54 and the associated propelling mechanism of the barge are at all times accessible for service and repairs during travel of the barge and are so positioned as to lower the barge center of gravity. It should be here noted that the propelling mechanism may in some instances be omitted when other means are provided for moving the barge.

It will thus be seen that the principles of this barge are equally applicable to parallel spaced tanks which contain the liquid cargo of the barge, and which are rigidly connected together in spaced relation by either an open framework which permits the complete access of water therebetween, or by a closed framework which provides a longitudinally extending chamber therebetween. In either event, novel features are believed to reside in a barge assembly consisting of two or more liquid containing tanks disposed in side-by-side relation and connected together by a rigid framework and provided with prow and stern members carried by the tanks to form a seaworthy vessel.

It is to be noted that the foregoing construction is possessed of utility as a barge or vessel for transporting and storing liquid cargo. However, in order to adapt such a vessel for the specific requirements pertaining to the transporting and storage of volatile liquids, various cooling systems may be provided with a view to preventing the liquid contents of the barge from exceeding a predetermined temperature, which would give rise to vaporization and expansion of the liquid contents and a dangerous rise in pressure of the volatile liquids.

As set forth in my above identified co-pending application, it is highly desirable in transporting volatile liquids, such as liquified butane, propane, ammonia or the like, that these liquids shall be stored under pressure to maintain the same in liquid condition, and shall completely fill their storage chamber in order to prevent the detrimental effects of a partially filled container, these defects including shifting centers of gravity, rendering the vessel unseaworthy; unduly agitating the liquid cargo, and the like. The present invention provides various features and structural refinements with a view to preventing undue heating of the liquid contents, positively cooling or refrigerating the same by a thermodynamic action, and providing better heat exchange relation between the contents of the barge and the cooler regions of the surrounding water.

Since in storing volatile liquids it is impossible to completely prevent temperature changes of the contents of the same, it is evident that some expansion and contraction of the liquid cargo is unavoidable. Accordingly, it is necessary to provide an expansion chamber to permit this expansion and contraction. The present invention makes use of this phenomena, in any of the various methods and constructions set forth in my above identified copending application, to produce a thermodynamic circulation and cooling or refrigerating of the contents of the tanks.

As set forth in my prior application No. 74,546, a thermal cooling system is provided utilizing the pressure rises induced by the inflow of heat into the storage tanks of the barge to cause a circulation refrigeration of the volatile liquid for cooling the same and reducing the maximum pressures developed upon the liquid by the inflow of heat. In the present application an embodiment for carrying out this purpose is illustrated wherein the barge consisting of the pair of tanks 10, connected by the upper and lower partitions 14 and 16, is provided with one or more expansion tanks or chambers 130 which chamber or chambers are disposed medially of the tanks 10 and supported thereabove and/or therebetween upon the partition 14 as by suitable pedestals or supports 132 and by lateral braces 134 from the tanks 10, if desired. In this construction, the expansion chamber or chambers 130 are positioned upon the medial center of the barge, whereby the same are subjected to the minimum of rocking or rolling motion of the barge and wherein the overall height of the barge may be reduced by lowering the chamber 130 between the upper surfaces of the two tanks.

Each of the tanks 10 is provided with a liquid overflow discharge conduit 136 suitably supported from the walls of the tank, and having its lower end disposed in a relatively cooled zone of the tank 10, whereby fluid may be discharged therefrom, passed through a spring-loaded, non-return pressure relief or expansion valve 138, and from thence may flow through a refrigerating coil 140 supported by suitable brackets 142 from the inner surface of the tank 10. This refrigerating coil 140 passes through the upper end of the tank 10 and by means of a conduit 144 having a resilient loop, see Figure 3, therein enters the expansion tank 130 from whence it is discharged through a nozzle or discharge conduit 148 terminating adjacent the upper end of the vapor and expansion chamber.

The overflow from the storage tanks 10, passing the pressure reduction valves 138 will experience a drop in pressure resulting in expansion of the overflow liquid, this expansion absorbing heat through the coils 140 thereby refrigerating which serves to lower the temperature and thus further lower the pressure in the storage tanks.

This oveflow from the storage tanks 10 through the refrigerating coils 140 into the expansion tank 130 will continue for as long as the pressure in a storage tank exceeds the pressure loading of its expansion valve 138 and the pressure within the expansion tank 130.

The liquid and/or vapor accumulating in the expansion tank 130 from the above mentioned intermittent overflow from the storage tanks 10 is periodically returned to these storage tanks, thus providing a step by step circulation between the storage and expansion tanks. This return is effected at these periods of the cycle of circulation when the pressure previously within the expansion tank 130 is temporarily sufficiently greater than that within the storage tank 10.

This temporarily greater pressure in the expansion tank usually occurs at night, when the storage tanks, being in good heat exchange relation with the cooler, sub-surface layers of water, which latter are uniformly below the critical temperature of the confined volatile liquid, and being no longer heated by the sun's rays are cooled, thereby reducing the pressure prevailing therein. The expansion tank, not being cooled by the sub-surface layers of water does not cool as rapidly as the storage tanks and the pressure of the contents trapped in the expansion tank therefore begins to exceed that of the storage tanks.

Whenever the pressure within the expansion tank 130 has temporarily exceeded, by a sufficient amount, pressure within a storage tank 10, a return flow of the overflow liquid into the storage tank occurs. This return flow leaves the expansion tank through the return conduit 147 and by means of a T-coupling 149 passes into either return conduit 150 having a non-return or check valve 151 therein. Each of the return conduits 150 has a plurality of condenser coils 153 disposed in a condenser 155, which coils have pipe sections 157 each connecting through a check valve 154 with a return pipe 159 which has its exit or discharged end disposed in the upper portion of one of the storage tanks 10.

The condensers 155 are exposed in intimate heat exchange relation with the uniformly cooler sub-surface layers of water as by being disposed in the longitudinal chamber between the tanks 10 and the partition plates 14, 16. As shown in Figure 1, the bottom wall of the condenser may be apertured at 161 to provide access for the cooler zone of water into the condenser.

The returning fluid is thus cooled in the condenser and any vapor therein is condensed by extraction of heat therefrom; and this cooled and condensed liquid is returned to the storage tanks past the check valve 154 in order to maintain the latter full of liquid.

In order to facilitate loading and unloading of the storage tanks, a by-pass conduit is provided in the return conduit system to establish free communication between the storage tank or tanks and the expansion tank. This by-pass conduit consists of a conduit 158 connected at one end to each of the return conduits 157, 159 by a T-coupling 163 and at the other end to a coupling 165 extending into the expansion tank 130 adjacent the bottom thereof.

Intermediate its ends, each by-pass conduit 158 has a control valve indicated generally at 160, illustrated in Figure 6 and referred to hereinafter, this valve being operated by remote control to establish free communication between the expansion tank 130 and one of the storage tanks 10.

As shown in Figure 2, the expansion chamber 130 may be provided with suitable manholes 162 to obtain access to the interior thereof.

It is to be understood that the tank 130 constituting the expansion chamber or vapor chamber of the system serves a plurality of functions. First, it is so positioned as to maintain a temperature differential between itself and the liquid storage tanks 10. For this purpose, the tank 130, being elevated above the surface of the water in which the barge floats, is directly exposed to the relatively higher temperature of the sun's rays and the atmosphere, whereas the tanks 10 being at least partially immersed in the water, as shown by the load line A—A of Figure 3, and having their lower surfaces disposed a considerable distance below the upper surface of the water, are relatively cooler and maintained at a relatively constant lower temperature. This temperature differential is utilized to obtain the energy for causing the refrigerating action in the contents of the barge.

In addition to its operation in the thermodynamic refrigeration of the barge contents, the tank 130 constitutes a buoyancy chamber which is especially effective when the barge is subjected to heavy seas and the like. During normal use, the storage tanks 10 are always maintained completely filled with liquid at all times, while the tank 130 is intended to always retain a small portion of liquid, the amount of which will vary during functioning of the refrigerating cycle of the barge, together with a relatively larger quantity of vapor from the volatile liquids. The expansion chamber or chambers 130, thus constitute supplemental buoyancy chambers which tend to stabilize and steady the barge to some extent when the same is encountering heavy seas and the like. This stabilizing effect is of course rendered more effective by the positioning of the tank 130 in the vertical plane which lies intermediate the two longitudinal axes of the two tanks. In constructions where more than two tanks 10 are employed, it is understood that an expansion tank 130 may be disposed between each adjacent pair of the tanks 10.

The barge may be loaded or unloaded in any of the various ways and by the various mechanisms set forth in my copending applications above identified. Since the invention claimed in the present case does not depend upon any particular loading or unloading means for the liquid cargo of the barge, a further description of the same appears to be unnecessary.

Referring again more specifically to Figures 3 and 6, it will be seen that the pressure release valve assembly 160 and which for convenience and illustration has been shown positioned between the expansion tank 130 and the storage tank 10, includes a casing 368 which is interposed between the two sections of the conduit 158 and is provided with a double headed piston valve 370. This valve has an annular, intermediate reduced portion 372 and is spring urged by a coiled compression spring 374 which is retained in one end of the casing 368 in abutting engagement with the valve 370 and a removable closure plug 375. This compression spring urges the valve into valve closing position thereby.

At the end of this valve, a fluid pressure conduit 376 is connected to any suitable source of pressure, such as that set forth in my copending application, Serial No. 74,546, whereby the piston head of the valve 370 may be urged by fluid pressure against the action of the return spring 374, to cause the reduced portion 372 to align with the passages in the conduit 158, thereby permitting flow of vapor or liquid through this conduit. By this means, the interior of the tank 10 is placed in open communication with the interior of the expansion chamber 130, thereby facilitating loading or unloading of the tanks 10.

The pressure relief valves 160 may be operated in unison with and simultaneously with the operation of the liquid control valves, not shown, for filling or emptying the tanks 10, or may be operated independent thereof by any suitable manual control means.

In the systems with which the present invention is employed, it is customary to fill the storage or pressure chambers completely with the volatile liquid, until the same overflows into the expansion tanks 130, so that a minimum portion of liquid is retained in the expansion chambers. The presence of this liquid is desirable in order that the thermodynamic circulating system will be primed and ready for operation when the barge is filled, and in order to insure that there shall be an ample quantity of volatile liquid to at all times keep the storage tanks completely filled therewith.

Inserted into the expansion tank 130 is an externally threaded valve fitting 400, which as shown in Figure 4 has an axial bore 402 extending therethrough, enlarged as at 404 to form a valve chamber for loosely receiving a reciprocating valve 406 therein. This valve is provided with a conical head portion which seats against a correspondingly shaped shoulder where the bores 402 and 404 intersect.

The valve body 400 at its inner end is provided with parallel lugs or ears 408, between which are pivotally connected the forked extremities 410 of a lever having a float 412 at its outer extremity. A connecting link 414 is terminally pivoted, as at 416, to the valve 406, and to a pivot pin 418 carried between the forked ends 410 of the float valve lever. This arrangement is such that when the float is in its lowered position, as when less than the desired liquid level prevails in the sump or lower portion of the expansion chamber 130, the link action of the arms 410 and the link 414 will move the valve 406 inwardly against its seat, thereby closing communication with the bore 402 and the interior of the sump and expansion chamber 130. As the liquid level rises, and begins to approximately attain the desired elevation, the float 412 will be raised and during this raising movement will withdraw the valve 406 from its seat, whereupon pressure produced within the chamber 130 by the forcing of the volatile liquid into the storage tank 10 will be permitted to escape through the bores 404 and 402. This escaping pressure will now pass through suitable conduits, to a warning whistle (not shown) for operating the same. Thus, when the desired liquid level has been attained in the expansion tank during the filling of the same, the whistle will be actuated to give a warning signal. This signalling system may be of any desired type, such as that set forth in my last-mentioned copending application, and since the same forms no part of the present invention claimed herein, further explanation regarding the same appears to be unnecessary.

From the foregoing, it is felt that the various constructions and operations in accordance with the principles of this invention will be fully understood, and further explanation thereof is believed to be unnecessary.

The construction illustrated in the drawings and described hereinbefore has been found to be satisfactory for use with barges for handling volatile liquid cargoes whose critical temperature is above that of the water in which the barge is immersed, or at least above the temperature of sub-surface water.

The usual manner of operation for this barge in the above mentioned conditions is as follows.

It is assumed that the barge is loaded with the tanks completely full of the volatile liquid, and preferably a slight accumulation of the volatile liquid in the bottom of the expansion tank 130, with the barge floating in water such that the upper portion of the tanks 10 will either be above water or else immersed in only the surface layer of the same, while the major and lower portions of the tanks 10 will extend to a considerable depth below the surface of the water and down into the sub-surface layers which have a prevailing constant temperature which is lower than that of the critical temperature of the volatile liquid cargo of the barge. Thus, the expansion tank 130 is exposed to the temperature of the surrounding atmosphere, the sun's rays and the like, and will thus, during certain periods such as day time, be subjected to an outside temperature which is greater than that of the critical temperature of the volatile liquid cargo. Similarly, the upper portions of the tanks 10 will either be subjected to the same source of temperature as the expansion tank 130, or to the temperature of the surface layer of water which likewise may be above the critical temperature of the volatile liquid cargo.

Under these conditions, an inflow of heat from the surrounding medium into the expansion tank 130 and the tanks 10 will occur, while an outflow of heat will prevail between the lower portions of the tanks and the relatively cooler sub-surface layers of the water.

Since the tanks 10 are substantially full of liquid whereas the tank 130 has only a small portion of liquid therein, the inflow of heat into the contents of these tanks will result in the rapid increase of pressure in the tank 10, since the liquid is substantially incompressible, which will result in an overflow or discharge of portions of the liquid of the tank 10, by way of the conduit systems 136, 138, 140 and 144 into the expansion tank 130. This discharge from the storage tank passing through the pressure reduction valve 138, will produce a refrigerating effect upon the contents of the tank 10 whereby lowering their temperature as the discharged liquid experiences a reduction in its pressure and an expansion of at least a part of the liquid into its vapor phase with an absorption of heat from its surroundings. Such flow will continue until the pressures between the tanks 10 and 130 are substantially equalized.

During the hot portions of the day, this expansion will persist thereby relieving the development of excessive pressures within the tank 10 by discharging portions of its contents into the expansion tank 130.

When the pressure within the storage tanks 10 drops below that of the expansion tank 130, by the flow of heat from the tanks 10 and into the water, the contents of the expansion tank being at a higher pressure than the storage tanks 10 will flow back through the condenser 155 and therein will revert to its liquid phase.

The contraction of the contents of the storage tanks lowering the pressure therein, in conjunction with the greater pressure trapped in the expansion tank 130, will produce a return flow of the liquid from the bottom of the tank 130 back into the tank 10. Thus, the latter will be continuously filled with liquid at all times, the liquid driven out by the heating of the tank 10, as during day light periods, being returned as liquid condensate as the tank 10 is cooled off as during night periods.

However, in situations where the prevailing sub-surface water temperature is not sufficiently low to adequately cool the contents of the tanks 10 or where a more rapid and frequent return of liquid from the expansion tank 130 to the tanks 10 is desired, it is possible to provide any suitable means for refrigerating the tank 130, or the return conduits 150 therefrom.

However, since numerous modifications and equivalents will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention, what is claimed as new is:

1. A barge for the transportation of a confined volatile fluid cargo under pressure in both its liquid and vapor phases comprising; a pair of storage tanks each sealed from the atmosphere and disposed in a generally horizontal plane and rigidly secured together in side by side relation, said storage tanks having a load water line substantially above the major volume of said tanks, thereby retaining said cargo in said storage tanks in heat exchange with the surrounding water, an expansion tank sealed from the atmosphere and in heat exchange relation therewith, means on the barge supporting the expansion tank above the load water line, said expansion tank being positioned generally upon the medial center of the barge, means including unidirectional flow control means establishing communication between the interior of each storage tank at substantially the zone of heat exchange relation thereof with the water and with said expansion tank thereby assuring unidirectional flow of cargo, upon expansion thereof, in its liquid phase from each of the storage tanks to the expansion tank, a flow return means including unidirectional flow control means establishing communication between the lower portion of the expansion tank and each of said storage tanks.

2. In a barge for the transportation of a confined volatile fluid cargo under pressure in both its liquid and vapor phases, a pair of storage tanks, each sealed from the atmosphere and disposed in a generally horizontal plane and rigidly secured together in side by side relation, the surface of said storage tanks being surrounded by water throughout the major portion thereof and having a heat exchange relation with the surrounding water over substantially the major lower portion of their surface area thereby effecting heat exchange relation between the cargo and the said surrounding water, an expansion tank sealed from the atmosphere and in direct heat exchange relation therewith, means for equalizing pressure and fluid within said storage tanks, means on the barge supporting the expansion tank above the storage tanks and generally upon the medial center of the barge, overflow means effecting non-return flow upon expansion of the cargo from the interior of at least one of the storage tanks from a point spaced below the top thereof to the interior of said expansion tank and return flow means effecting return flow from the lower portion of the expansion tank to at least one of the storage tanks when the pressure in the latter is less than that in the expansion tank, whereby the storage tanks will normally be retained filled with the cargo in its liquid phase and the expansion tank will be filled with the cargo in both its liquid and vapor phases.

3. The combination of claim 2 wherein said overflow means includes means for reducing the pressure upon and thereby expanding into its vapor phase the overflow liquid passing from the said storage tank to the expansion tank, said overflow means including a heat exchange means adjacent the top of the said storage tank in heat exchange relation with the fluid in the said storage tank for absorbing heat from and thereby cooling the fluid in the said storage tank.

4. The combination of claim 2 wherein said overflow means includes means for reducing the pressure upon and thereby expanding into its vapor phase the overflow liquid passing from the said storage tank to the expansion tank, said overflow means including a heat exchange means in heat exchange relation with the fluid in the said storage tank for absorbing heat from and thereby cooling the fluid in the said storage tank, said heat exchange means comprising a refrigerating coil disposed in the said storage tank and in contact with the upper wall portion thereof.

5. The combination of claim 2 wherein said return means has an exit within and spaced from the sides of at least one of said storage tanks.

6. The combination of claim 2 wherein said return means includes a heat exchange means in heat exchange relation with the surrounding water.

7. The combination of claim 6 wherein the heat exchange means is disposed between said storage tanks.

8. The combination of claim 2 wherein said return means includes a heat exchange means located adjacent the bottoms of the storage tanks and in heat exchange relation with the surrounding water.

9. The combination of claim 2 wherein said return means includes a heat exchange means in heat exchange relation with the surrounding water and disposed between said storage tanks, bypass means connecting the lower portion of the expansion chamber with said return means between the heat exchange means thereof and the said storage tank.

10. The combination of claim 8 wherein said bypass means includes a unidirectional flow control means preventing flow from the said storage tank through the conduit means towards said expansion tank.

References Cited in the file of this patent

UNITED STATES PATENTS

| | | |
|---|---|---|
| 733,583 | Harvey | July 14, 1903 |
| 1,140,250 | Cabot | May 18, 1915 |
| 1,715,112 | Atwell | May 28, 1929 |
| 2,179,682 | Booth | Nov. 14, 1939 |
| 2,379,295 | Gunning | June 26, 1945 |
| 2,401,453 | Bell | June 4, 1946 |
| 2,408,505 | Brandon | Oct. 11, 1946 |

FOREIGN PATENTS

| | | |
|---|---|---|
| 24,981 | Austria | July 25, 1906 |
| 194,238 | Great Britain | Mar. 8, 1923 |